United States Patent [19]

Bourquin

[11] 4,183,411
[45] Jan. 15, 1980

[54] WEED PULLER APPARATUS

[75] Inventor: Daniel T. Bourquin, Colby, Kans.

[73] Assignee: Bourquin Design and Mfg., Inc., Colby, Kans.

[21] Appl. No.: 868,044

[22] Filed: Jan. 9, 1978

[51] Int. Cl.² .................... A01D 27/04; A01D 25/04
[52] U.S. Cl. .......................................... 171/58; 56/51; 56/10.2
[58] Field of Search ...................... 171/58, 62; 56/295, 56/10.2, 50–61

[56] References Cited

U.S. PATENT DOCUMENTS

| 604,413 | 5/1898 | Palm | 56/295 |
|---|---|---|---|
| 1,111,210 | 9/1914 | Brandis | 171/62 X |
| 1,397,365 | 11/1921 | Cook | 56/295 X |
| 3,464,190 | 9/1969 | Lester et al. | 56/10.2 |
| 3,769,782 | 11/1973 | Cler | 56/51 |
| 4,027,733 | 6/1977 | Eisenhardt et al. | 171/58 |

FOREIGN PATENT DOCUMENTS

491624  2/1919  France ...................... 171/58

*Primary Examiner*—Russell R. Kinsey
*Attorney, Agent, or Firm*—Phillip A. Rein

[57] ABSTRACT

This invention is a weed puller apparatus connectable to the rear or front portions of a tractor and can be used jointly with a cultivator to loosen the soil. The weed puller apparatus includes (1) a main support means selectively connected to the rear or front of the tractor; (2) a weed pulling means connected to the main support means; and (3) a power and control means operably associated with the power supply of the tractor and connected to the weed pulling means to drive same. The weed pulling means includes cooperating pairs of contacting weed pulling assemblies, some are driven by the power means and others are driven by frictional contact between adjacent ones. Each weed pulling assembly includes (1) a pair of adjacent and axially aligned wheel members; (2) support shaft assembly to rotatably support the respective pairs of wheel members; (3) a support arm assembly to connect each support shaft assembly to the main support means; and (4) a guard and alignment assembly mounted about each support shaft assembly. Each guard and alignment assembly includes a cylindrical guard member to keep weeds from winding about the support shaft assembly and flexible spike member to contact and straighten weeds for subsequent pulling thereof. Every other pair of the weed pulling assemblies are rotating in opposite and upward directions whereby the adjacent wheel members cooperate to grasp and pull weed members upwardly therebetween. The invention includes a crop level sensing control means to automatically maintain the weed pulling apparatus above the crop level to only extract the weed members.

18 Claims, 12 Drawing Figures

WEED PULLER APPARATUS

PRIOR ART

Numerous prior art U.S. Pat. Nos. are noted that are operable to cut or harvest row crops and many that use a pair of adjacent, rotating tire members to do so. The following patents are deemed to be of interest relative to the invention presented herewith: Cler 3,769,782, Wehde 3,716,974, Barrentine 3,437,152, Boyer 3,426,515, Eisenhardt 4,027,733.

The Cler device is a detasseling device teaching the use of pairs of contacting tire members. The Wehde patent teaches the use of cooperating tire members and cutters to harvest beans or the like.

Barrentine uses inclined cooperating tire members to pull stalks from the ground. Boyer is a cabbage harvester but not pertinent to the applicant's invention.

The Eisenhardt patent is pertinent in teaching the same function being a weed pulling machine. The novelty in the claims allowed by Eisenhardt is limited by separate means to drive each of the cooperating wheel means.

Numerous features of the applicant's invention are not shown by the references cited such as dual wheel members, special guard and alignment assembly, automatic crop level feature, and special means of support and wheel member adjustment.

PREFERRED EMBODIMENT OF THE INVENTION

In one preferred embodiment, a weed puller apparatus is provided including (1) a main support means connected to a front or rear portion of a tractor; (2) weed pulling means secured to the main support means, and (3) power means connected to the weed pulling means to drive same. The main support means includes an elongated rectangular tube member extended transverse of the longitudinal axis of the tractor. The weed pulling means includes cooperating pairs of weed pulling assemblies with certain pairs thereof rotating in opposite, upward directions to cooperate and pull weed members therebetween. Each weed pulling assembly includes (1) a pair of adjacent, axially aligned wheel members; (2) a support shaft assembly having the wheel members mounted thereon for rotational movement; (3) a support arm assembly having a lower end connected to a respective support shaft assembly and an upper end pivotally connected to the main support means; and (4) a guard and alignment assembly mounted between respective wheel members and support arm assemblies. Each weed pulling assembly cooperates with an adjacent one with the outer surfaces of the pairs of wheel members contacting adjacent ones thereof to perform (a) a rotational power driving contact; and (b) certain ones also act as weed pulling structures. The guard and alignment assemblies each have a cylindrical guard member surrounding respective ones of the support shaft assemblies and spaced, flexible spike members mounted about the periphery of the respective guard members. The guard members prevent weed members from winding about the support shaft assemblies and the spike members operate to contact and straighten the weed members prior to pulling by the cooperating wheel members. Also, available are extra weed pulling attachment assemblies connected to the outer ends of the basic weed puller apparatus to change from a 4 row to a 6 or 8 row weed pulling structure. A crop level sensing control means may be interconnected to the main power and control means to continuously sense the level of crops below the weed pulling means to raise and lower same automatically to remain a predetermined distance above the crop. This assures that the weed members only will be removed by the weed puller apparatus of this invention.

OBJECTS OF THE INVENTION

One object of this invention is to provide a weed puller apparatus that can be selectively attached to a front or rear portion of a farm tractor in an easy manner.

Another object of this invention is to provide a weed puller apparatus including a plurality of hydraulically driven cooperating wheel members having outer surfaces thereof in contact to grasp and pull weed members from the adjacent soil.

One other object of this invention is to provide a weed puller apparatus including a plurality of pairs of cooperating weed pulling assemblies operable to pull weed members, each having a guard and alignment assembly connected thereto operable to, first, protect a rotating shaft from entanglement with the weed members and, secondly, to contact and straighten the weed members.

One further object of this invention is to provide a weed puller apparatus having a crop level sensing control means to automatically adjust the height of cooperating pairs of weed pulling assemblies above the crop being weeded.

Still, one other object of this invention is to provide a weed puller apparatus that is simple and durable in construction, easily attachable to the rear or front portions of a tractor, substantially maintenance free, and reliable in operation.

Various other objects, advantages, and features of the invention will become apparent to those skilled in the art from the following discussion, taken in conjunction with the accompanying drawings, in which:

DRAWINGS OF THE INVENTION

The following is a discussion and description of preferred specific embodiments of the new weed puller apparatus of this invention, such being made with reference to the drawings, whereupon the same reference numerals are used to indicate the same or similar parts and/or structure. It is to be understood that such discussion and description is not to unduly limit the scope of the invention.

SPECIFICATION OF THE INVENTION

Figures 1, 2:
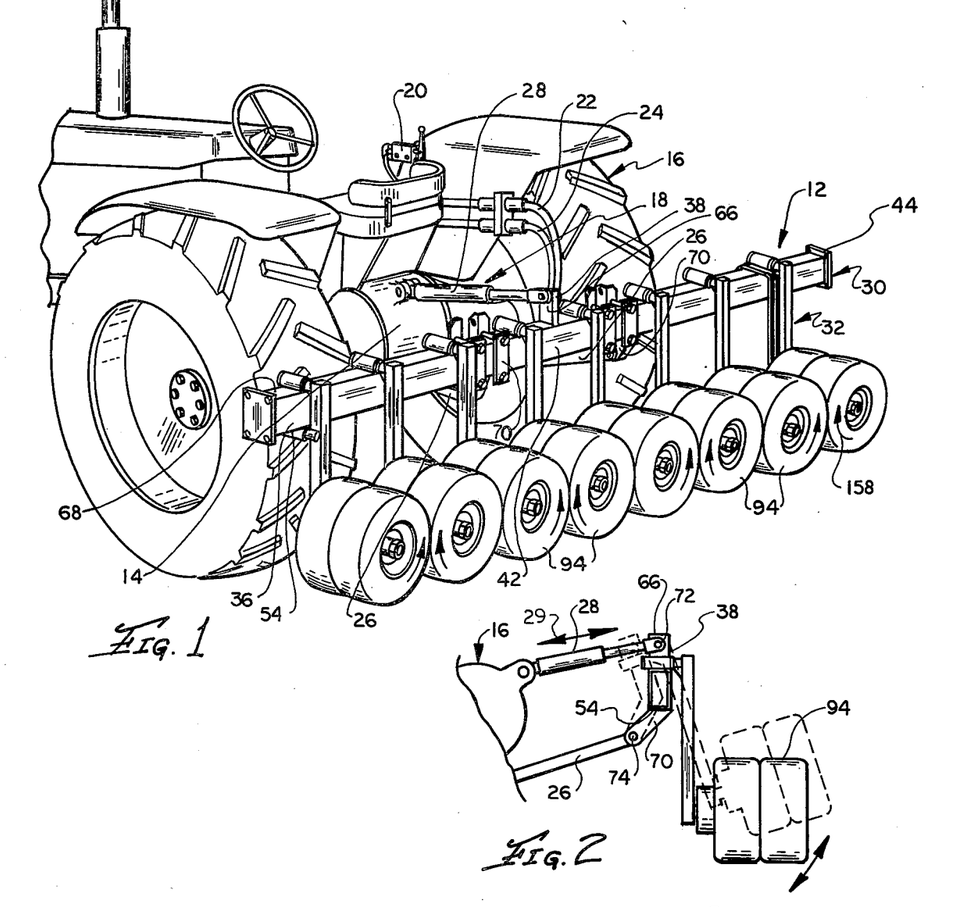
FIG. 1 is a perspective view of the weed puller apparatus of this invention shown as rear mounted on a farm tractor which is partially illustrated.
FIG. 2 is a fragmentary side elevational view of the weed puller apparatus and farm tractor shown in FIG. 1 illustrating vertical movement of the weed puller apparatus in dotted lines.

As shown in FIG. 1, a weed puller apparatus of this invention, indicated generally at 12, is shown as attached to a rear portion 14 of a farm tractor 16. More particularly, the farm tractor 16 is of a conventional nature having a three-point hitch assembly 18 and a hydraulic control valve 20 operable selectively to convey pressure fluid through a first line 22 and back to a fluid reservoir (not shown) through a second line 24 or vice versa. The pressure fluid may be generated by an auxiliary hydraulic pump and motor assembly or, as in this illustration, supplied through the hydraulic control valve 20 from a hydraulic pump built into the farm tractor 16.

The three-point hitch assembly 18 is typical including a pair of parallel support arms 26 and an upper central piston and cylinder assembly 28. The support arms 26 are pivoted to raise and lower the weed puller apparatus 12 by use of the hydraulic control valve 20 and movement of the piston and cylinder assembly 28. The piston and cylinder assembly 28 is operable under fluid pressure from the hydraulic control valve 20 to selectively tilt the weed puller apparatus 12 as shown by solid and dotted lines in FIG. 2 when the piston and cylinder assembly 28 is activated as shown by arrow 29.

The basic weed puller apparatus 12 includes (1) a main support means 30 connectable to the three-point hitch assembly 18; (2) a weed pulling means 32 secured to the main support means 30; and (3) a power means 34 operably connected to the hydraulic control valve 20 and the weed pulling means 32. The main support means 30 includes a main support member 36 having mounted thereon a rear end connector assembly 38 in FIG. 1 and a front end connector assembly 40 mounted thereon in FIG. 8.

Figures 4, 5, 6, 7:
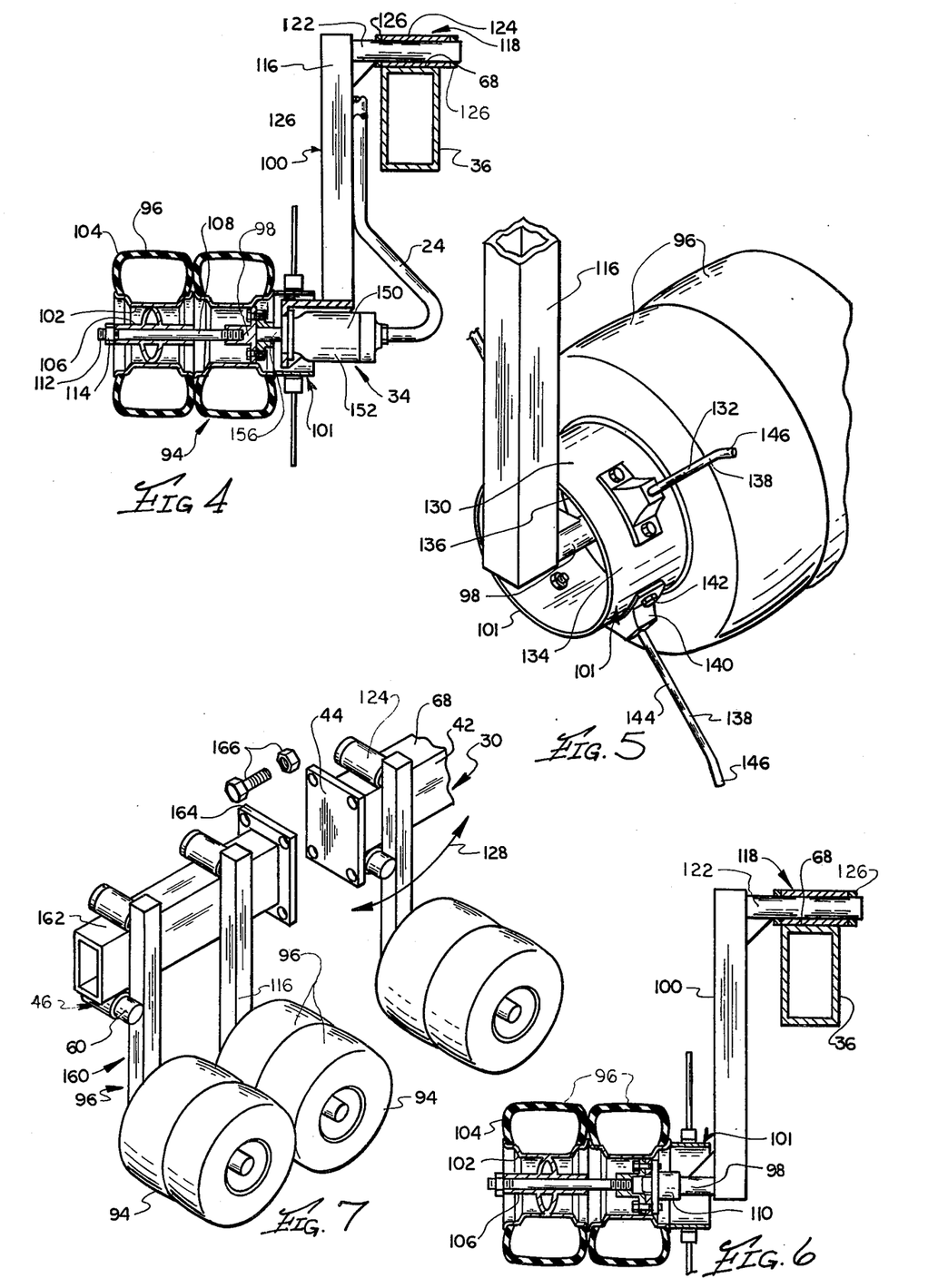
FIG. 4 is an enlarged sectional view taken along line 4—4 in FIG. 3.
FIG. 5 is an enlarged fragmentary perspective view of a weed pulling assembly of the weed puller apparatus of this invention.
FIG. 6 is a sectional view taken through line 6—6 in FIG. 3.
FIG. 7 is a perspective view of a weed pulling attachment assembly illustrating possible connection to one end of the weed puller apparatus of this invention.

The main support member 36 includes an elongated rectangular tube member 42 having connector plates 44 and lock arm assemblies 46 secured to opposite ends thereof. Each connector plate 44 extends vertically and has four (4) holes therein for connection thereto of an auxiliary weeding device to be explained (FIG. 7).

Figure 12:
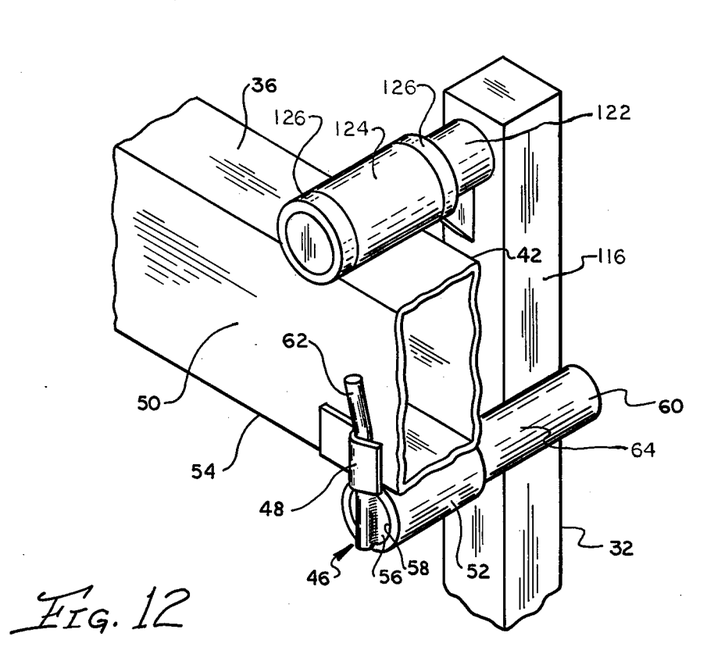
FIG. 12 is a perspective view of a lock arm assembly of the weed puller apparatus of this invention.

As best shown in FIG. 12, the lock arm assembly 46 includes (1) a lock plate 48 secured to a sidewall 50 of the tube member 42; (2) a connector tube 52 secured to a bottom wall 54 of the tube member 42; and (3) a latch arm 56 operably associated with the lock plate 48 and the connector tube 52. The connector tube 52 is an open cylinder having a central hole 58 therethrough.

The latch arm 56 is a rod member 60 having a handle member 62 welded at one end of the rod member 60 and extended perpendicular thereto.

In the assembled condition, the rod member 60 is inserted through the connector tube 52 with an outer end 64 engagable with outer ones of the weed pulling means 32 for reasons to be explained. The handle member 62 is engagable with the lock plate 48 to hold the rod member 60 against axial movement. The entire latch arm 56 is removed from the connector tube 52 while performing maintenance on the weed pulling means 32.

The rear end connector assembly 38 includes (1) a tilt control plate 66 secured mid-way of a top surface 68 of the tube member 42; and (2) a pair of spaced, parallel support plates 70 secured to the bottom wall 54 of the tube member 42. As noted in FIG. 2, the tilt control plate 66 is connectable by a pin member 72 to the piston and cylinder assembly 28 for tilting movement of the entire weed puller apparatus 12. Also, the support plates 70 are connected by pins 74 to respective ones of the support arms 26 to raise and lower the entire weed puller apparatus 12.

Figure 8:
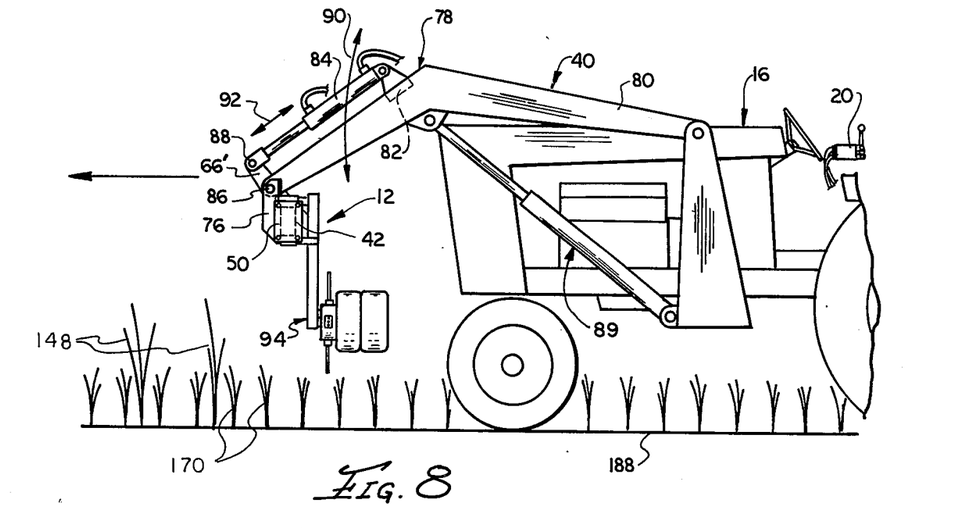
FIG. 8 is a side elevational view of the weed puller apparatus of this invention shown as front mounted on a fram tractor which is partially illustrated.

As best noted in FIG. 8, the front end connector assembly 40 includes (1) a tilt control plate 66' and (2) a pair of spaced, parallel support plate members 76 secured to the sidewall 50 of the tube member 42. When mounting on a front portion of the farm tractor 16, a front loader assembly 78 is used having spaced, parallel lift arms 80; a base plate 82 extended between the lift arms 80; and a control piston and cylinder assembly 84 mounted on the base plate 82. The lift arms 80 are connected by pins 86 to the respective support plate members 76 and the control piston and cylinder assembly 84 is connected by a pin 88 to the tilt control plate 66.

It is obvious that the lift arms 80 are movable by the control valve 20 to actuate a piston and cylinder assembly 89 on the tractor 16 as shown by an arrow 90 to raise and lower the weed puller apparatus 12 when in the front mounted condition. Also, the control piston and cylinder assembly 84 is movable as shown by an arrow 92 by the control valve 20 to tilt the weed puller apparatus 12.

The weed pulling means 32 includes cooperating pairs of weed pulling assemblies 94, namely, four (4) thereof, operable to simultaneously weed four separate rows in a manner to be described. As each weed pulling assembly 94 is substantially identical, only one need be described in detail.

As shown collectively in FIGS. 4, 5, and 6, each weed pulling assembly 94 includes (1) a pair of adjacent wheel members 96; (2) a support shaft assembly 98 to rotatably support the wheel members 96 thereon; (3) a support arm assembly 100 connected at a lower end to the support shaft assembly 98 and at an upper end to the top surface 68 of the main support member 36; and (4) a guard and alignment assembly 101 mounted between the support shaft assembly 98 and the support arm assembly 100.

Each wheel member 96 resembles a conventional tire structure having a support hub 102 with a tire member 104 mounted thereon. Each support hub 102 has a central bearing sleeve 106 so as to be readily rotatable on the support shaft assembly 98. The adjacent support hubs 102 are preferably connected to each other for conjoint rotation.

Each support shaft assembly 98 includes a shaft member 108 extended through the bearing sleeve 106 and connected to a bearing member 110 to allow rotation of the wheel members 96. An outer end 112 of the shaft member 108 is threaded to receive a lock nut 114 thereon. The other end of the shaft member 108 is connected to a lower end of the support arm assembly 100 which extends perpendicular therefrom.

The support arm assembly 100 includes a square tubular support member 116 having a bearing support assembly 118 connected to an upper end 120 thereof. The bearing support assembly 118 includes (1) a connector shaft 122 with one end secured to the support member 116; (2) a bearing sleeve member 124 mounted about the connector shaft 122 and welded to the top surface 68 of the main support member 36; and (3) bearing end plates 126 secured to the connector shaft 122 at opposite ends of the bearing sleeve member 124 to prevent relative axial movement of the connector shaft 122 permitting pivotal movement as shown by arrow 128 in FIG. 7.

It is noted that each entire weed pulling assembly 94 is pivotal about the bearing sleeve member 124 as shown by arrow 128 for reasons to become obvious (FIG. 7).

As shown in FIG. 5, each guard and alignment assembly 101 includes a cylindrical guard member 130 secured to an outer periphery of the inner wheel member 96 at the hub 102 and a plurality, namely four, of spike assemblies 132 secured to and equally spaced about an outer surface 134 of the guard member 130. The guard member 130 has an outer edge 136 positioned adjacent the support member 116 and acts as a shield or guard to prevent weed members from becoming entangled about the support shaft assembly 98.

Each spike assembly 132 includes a spike or finger member 138 connected to a support clamp 140 which, in turn, is secured by nut and bolt members 142 to the guard members 130. The spike member 138 is formed with a central body 144 integral with an inclined outer end portion 146.

The support clamp 140 is constructed of a flexible material such as rubber so that the spike member 138 acts to pick up and straighten weed members 148 but will flex without breaking when hitting rocks and other such obstacles.

As shown in FIG. 4, the power means 34 includes a drive assembly 150 which can be mounted on one of the weed pulling assemblies 94. More particularly, the drive assembly 150 is a hydraulic motor member 152 selectively supplied with pressure fluid from the control valve 20 on the farm tractor 16 or an auxiliary supply. The pressure fluid is conveyed to and from the motor member 152 by the first and second lines 22, 24. The motor member 152 drives a power shaft 156 which, in turn, is connected to the shaft member 108 of the support shaft assembly 98.

It is obvious that rotation of the power shaft 156 drives the dual wheel members 96 in a direction shown by an arrow 158 in FIG. 1. The contacting outer surfaces of the tire or wheel members 96 act to power adjacent ones thereof. This operates for adjacent pairs of the wheel members 98 to rotate the surfaces therebetween in an upward direction for a weed pulling operation to be explained.

As shown in FIG. 7, an additional weed pulling attachment assembly 160 may be added to each end of the weed puller apparatus 12 to increase same from a 4 row to a 6 row weeder structure. The weed pulling attachment assembly 160 includes a tube member 162 having an end plate 164 to be secured by nut and bolt members 166 to a respective end connector plate 44 of the main support means 30.

A pair of previously described weed pulling assemblies 94 are connected to the tube member 162. Also, it is noted that the lock arm assembly 46 is needed to provide a stop by the rod member 60 to keep sufficient frictional contact between adjacent pairs of the wheel members 96.

It is noted that an 8 row weeder structure can be provided merely by joining together two of the basic weed puller apparatuses 12.

Figures 9, 10:
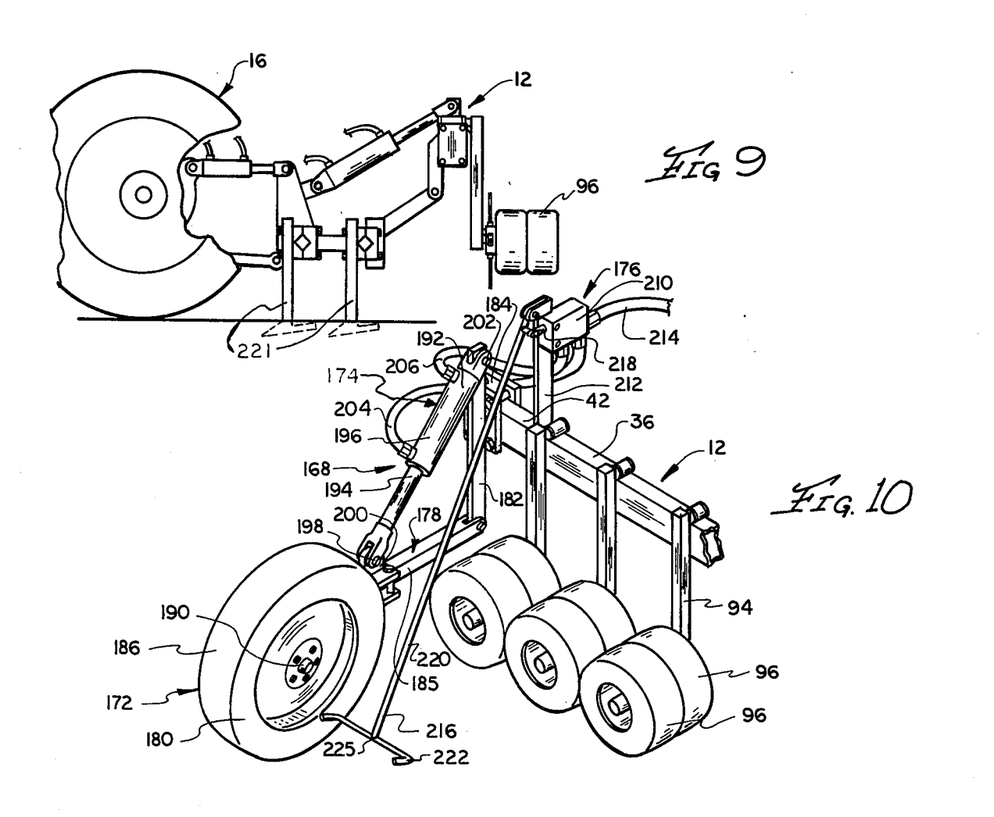
FIG. 9 is a side elevational view of the weed puller apparatus mounted on a rear portion of a farm tractor similar to FIG. 2 and including cultivator members mounted thereon to work the soil.
FIG. 10 is a fragmentary perspective view of a weed puller apparatus of this invention having a weed pulling attachment assembly connected thereto.
Figure 11:
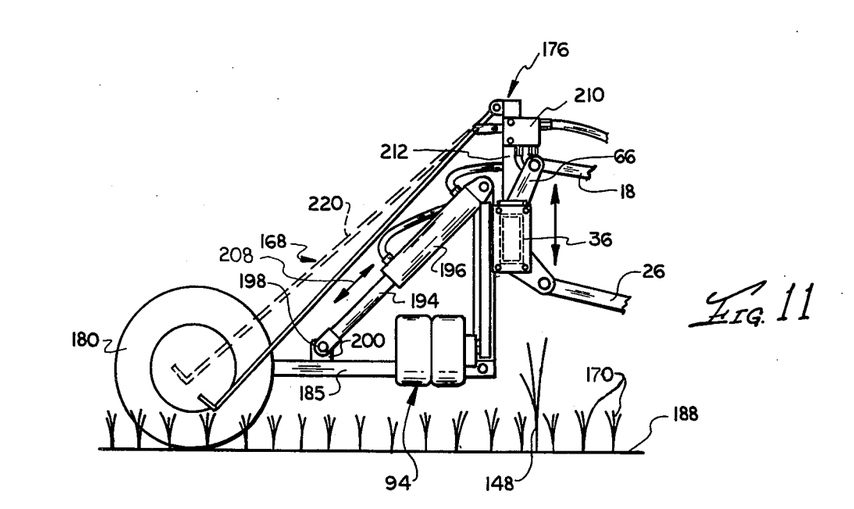
FIG. 11 is a side elevational view of the weed puller apparatus and weed pulling attachment assembly shown in FIG. 9.

An attachment for the weed puller apparatus 12 of this invention, as shown in FIGS. 10 and 11, is a crop level sensing control means 168 to automatically raise and lower the weed puller apparatus 12 to assure that only the weed members 148 and not a crop member 170 is pulled. The crop level sensing control means 168 includes (1) a wheel support assembly 172, one each connected to opposite ends of the main support member 36; (2) a wheel actuator assembly 174 connected to each wheel support assembly 172; and (3) a crop level sensing assembly 176 connected at one end of the main support member 36.

The wheel support assembly 172 includes a connector assembly 178 supporting a wheel member 180. The connector assembly 178 includes (1) a vertical support post 182 secured by a connector clamp 184 to the tube member 42; and (2) a lateral support arm 185 having one end pivotally connected to a lower end of the vertical support post 182 and an outer end connected to the wheel member 180.

The wheel member 180 has a tire member 186 to contact a support surface 188 and a central hub member 90. The outer end of the lateral support arm 185 is connected to the hub member 190 in a manner as by a bearing member to allow rotation of the wheel member 180.

The wheel actuator assembly 174 is a piston and cylinder assembly 194 having a piston member 194 mounted in a cylinder member 196. The piston member 194 has an outer end connected by a pin 198 to a support lug 200 on the lateral support arm 185. An upper end of the cylinder member 196 is pivotally connected by a pin member 202 to the vertical support post 182.

The cylinder member 196 is supplied with pressure fluid through lines 204 and 206 to move the piston member 194 in a conventional manner as shown by an arrow 208. Obviously, such movement would raise and lower the wheel member 180 and interconnected weed puller apparatus 12. The lines 204 and 206 are connected to the crop level sensing assembly 176 to control operation of the wheel support assembly 172.

The crop level sensing assembly 176 includes (1) a control valve 210 mounted on a support member 212 which is secured to the tube member 42; (2) a control fluid supply 214 connected to the control valve 210; and (3) a sensing arm member 216 operably connected to the control valve 210.

The control valve 210 is of a type having a plunger member 218 to restrict, increase, or block a fluid opening therein to direct fluid pressure selectively to lines 204 and 206 to raise and lower the wheel support assembly 172. Numerous such control valves 210 are known to the prior art.

The sensing arm member 216 resembles a rake structure having an elongated main body 220 with an upper end pivotally connected to the control valve 210 and a lower end connected to a sensor member 222. The upper end of the main body 220 is also connected to the plunger member 218 to cause movement thereof on movement of the sensing arm member 216 as shown in solid and dark lines in FIG. 11.

The sensor member 222 extends laterally of the main body 220 and provides a substantial bottom surface 225 to contact the crop members 170. This causes movement of the plunger member 218 to control fluid pressure flow to the piston and cylinder assembly 192 to automatically raise and lower the weed puller apparatus 12 and maintain a desired height thereof above the crop members 170.

It is noted in FIG. 9 that the weed puller apparatus 12 of this invention can be used in conjunction with soil cultivators 221 which would loosen the soil and permit easier extraction of the weed members 148.

USE AND OPERATION OF THE INVENTION

As shown in FIG. 1, the weed puller apparatus 12 is readily attached to the rear portion 14 of the farm tractor 16 through the three-point hitch assembly 18. The parallel support arms 26 and the piston and cylinder assembly 28 are connected to the weed puller apparatus 12 in a conventional manner. The weed puller apparatus 12 is tiltable as shown in dotted lines in FIG. 2 on operation of the piston and cylinder assembly 28 as shown by the arrow 29. The support arms 26 are pivotal to raise the entire weed puller apparatus 12 for transport purposes. Also, the movement of the support arms 26 and the piston and cylinder assembly 28 are coordinated to (1) place the wheel members 96 in a generally vertical or slightly tilted upwardly and rearwardly; and (2) to place the cooperating wheel members 96 at a proper height to miss contact with the crop members 170 but pull the weed members 148 (FIG. 3).

Figure 3:
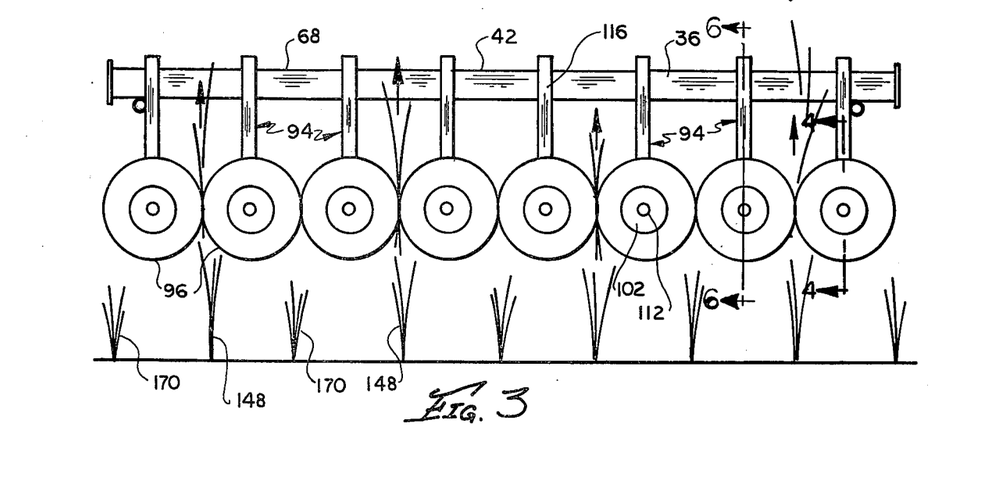
FIG. 3 is a schematic rear, elevational view of the weed puller apparatus of this invention as applied to a weed pulling operation.

The farm tractor 16 is manipulated to place the center of every other pair of wheel members 96 above the weed members 148 to be pulled as shown in FIG. 3. It is obvious that the basic weed puller apparatus 12 is then operable to simultaneously pull weeds from four (4) rows of weed members 148. The hydraulic control valve 20 is operated to power the hydraulic motor member 152 to drive its wheel members 96 as shown by arrow 158. Each adjacent pair of wheel members 96 are then driven in an opposite direction due to frictional contact therebetween. The combination of the dual wheel members 96 and their frictional contact is very important as allows one hydraulic motor motor member 152 to drive the entire cooperating weed pulling assemblies 94.

The contacting pairs of wheel members 96 operate to grasp the weed members 96 and pull same upwardly and outwardly of the supporting soil.

The lock arm assemblies 46 are operable to hold the outer ones of the weed pulling means 32 inwardly to assure pressure between the wheel members 96. The respective latch arms 56 are removed from the connector tubes 52 when performing maintenance on the weed pulling means 32.

Also, it is noted that frictional contact between the wheel members 96 and, thus adjustment of the weed pulling operation, can be controlled by regulating air pressure in the wheel members 96.

Another important feature of the invention is the use of the guard and alignment assembly 101 associated with the respective inner wheel members 96. The guard members 130 covers the respective support shaft assembly 98 to keep the weed members 148 from becoming entangled thereon.

Also, associated with each guard member 130 is a spike assembly 132 having flexible spike members 138 connected thereto. The rotating spike members 138 act to first contact the weed members 148 to pull same upwardly like a raking action for subsequent grasping and pulling out the weed members 148.

As shown in FIG. 7, an additional weed pulling attachment assembly 160 can be secured to each opposite end of the weed puller apparatus 12 to change the structure from a four (4) to a six (6) row weeder structure. The connector plates 44 are secured to the respective end plates 164 by the nut and bolt members 166 in a conventional manner.

Another feature of this invention is shown in FIG. 8, wherein the weed puller apparatus 12 can be connected to a front portion of the farm tractor 16 by the front end connector assembly 40. The lift arms 80 are moved about an arc shown by arrow 90 to raise and lower the weed puller apparatus 12. Also, a control piston and cylinder assembly 84 is movable as shown by the arrow 92 to tilt the weed puller apparatus 12 as desired. The weed puller apparatus 12 operates as previously described for the rear mounted operation. The front mounted operation is desirable for pulling larger weeds such as shatter cane and corn in soybeans and grain sorghum or when pulling velvet leaf and sunflowers.

As noted in FIG. 9, the weed puller apparatus 12 can be used with conventional, earth cultivator structures, indicated at 221, which act to loosen the soil before the weed pulling operation.

As shown in FIGS. 10 and 11, an auxiliary attachment is a crop level sensing control means 168 that can be added to the weed puller apparatus 12 to automatically raise and lower same on sensing height of the crop members 170. The crop level sensing means 168 includes the wheel support assembly 172 connected to opposite ends of the main support member 36 and crop level sensing assembly 176 mounted at one end of the main support member 36. A wheel actuator assembly 174 is connected to each wheel support assembly 172 to raise and lower same.

More specifically, the crop level sensing assembly 176 has the sensing arm member 216 which contacts the crop members 170 and controls fluid pressure movement from a supply line 214 through the control valve 210 to the piston and cylinder assembly 192. Movement of the sensing arm member 216 operates to present pressure fluid through lines 204 or 206 to retract or extend the piston member 194 as noted by the arrow 208. Obviously, this operates to raise and lower the weed puller apparatus 12 having the wheel member 180 contacting the support surface 188.

The weed puller apparatus of this invention presents a compact, durable structure to pull weed members in a unique, efficient manner. The weed puller apparatus is easy to use, simple to connect for front or rearward use on a farm tractor, and substantially maintenance free. The power means uses a power drive on only one weed pulling means to drive eight (8) sets of wheel members. On large weed puller apparatuses of 6–8 or 10 row weed puller structures, a second drive motor or pump may be used as deemed necessary.

While the invention has been described in conjunction with preferred specific embodiments thereof, it will be understood that this description is intended to illustrate and not to limit the scope of the invention, which is defined by the following claims.

I claim:

1. A weed puller apparatus adapted to be connected to a vehicle such as a farm tractor to be pulled through a crop having weed members therein to be removed, comprising:
   (a) a main support member connected to the farm tractor;
   (b) weed pulling means connected to said main support member having cooperating pairs of weed pulling assemblies;
   (c) adjacent ones of said weed pulling assemblies each having a wheel member in frictional contact with an adjacent wheel member;
   (d) power means connected to one of said weed pulling assemblies to drive one of said wheel members which, in turn, drives the remaining ones of said wheel members being in frictional contact with each other; and
   (e) each of said weed pulling assemblies includes a support shaft assembly connected at one end to said wheel member and a support arm assembly connected at one end to said support shaft assembly and pivotally connected at another end to said main support means; whereby said wheel members resemble a pendulum structure and each being pivotal about said main support means and relative to each other;
   whereby only one of said wheel members are positively driven and cooperating surfaces of said wheel members are operable to grasp the weed member to pull upwardly of the supporting soil.

2. A weed puller apparatus as described in claim 1, wherein:
   (a) each of said weed pulling assemblies having a guard member mounted about a respective one of said support shaft assemblies and connected to said wheel members for conjoint rotation therewith to prevent material from wrapping and collecting thereabout.

3. A weed puller apparatus as described in claim 2, wherein:
   (a) said guard member of a cylindrical shape extended substantially the entire length of said support shaft assembly to protect same.

4. A weed puller apparatus as described in claim 2, wherein:
   (a) each of said weed pulling assemblies having a spike member connected to an outer periphery of respective ones of said guard members being operable to contact, on rotation of wheel members, the weed members and straightens same for subsequent pulling thereof by said cooperating wheel members.

5. A weed puller apparatus as described in claim 4, wherein:
   (a) a plurality namely four, of said spike members are mounted and equally spaced about a periphery of said guard member, and
   (b) each of said spike members are mounted in resilent support clamps secured to said guard member whereby said spike members are flexible on hitting obstructions.

6. A weed puller apparatus as described in claim 1, wherein:
   (a) each of said weed pulling assemblies includes a support shaft assembly connected at one end to said wheel member and a support arm assembly connected at one end to said support shaft assembly and pivotally connected at another end to said main support means; and
   (b) said support arm assembly having a support member connected at a lower end to said support shaft assembly and connected at an upper end through a bearing support to said main support means;
   whereby said wheel members resemble a pendulum structure and each being pivotal about said main support means and relative to each other.

7. A weed puller apparatus as described in claim 6, wherein:
   (a) said main support means having a lock arm assembly connected to opposite ends thereof;
   (b) said lock arm assembly includes a removable latch arm mounted in a connector tube which is secured to said main support means; and
   (c) said latch arm engagable with outer ones of said support arm assemblies to maintain said weed pulling assemblies in contact.

8. A weed puller apparatus as described in claim 7, wherein:
   (a) said lock arm assembly having a lock plate secured to said main support means; and
   (b) said latch arm engagable with said lock plate in the assembled condition holding outer ones of said weed pulling assemblies against outward movement.

9. A weed puller apparatus as described in claim 8, wherein:
   (a) said latch arm having a rod member integral with a handle member;
   (b) said rod member extends through said connector tube;
   (c) said handle member engagable with said lock plate in the assembled condition;
   (d) said handle member movable laterally of said lock plate and said rod member movable axially and outwardly of said connector tube;
   whereby said latch arm is out of contact with said weed pulling assembly so that maintenance can be performed thereon.

10. A weed puller apparatus as described in claim 1, wherein:
    (a) a crop level sensing control means including a wheel support assembly mounted at each opposite end of said main support means, a wheel actuator assembly mounted between each of said wheel support assemblies and said main support means, and a crop level sensing assembly connected to said main support means and operably connected to each of said wheel actuator assemblies;
    (b) said crop level sensing assembly includes a sensing arm connected to a control valve; and
    (c) said control valve connected to said wheel actuator assembly which, in turn, is operable to raise and lower said main support means relative to said wheel support assemblies;
    whereby said sensing arm is movable on contact with the crop members to actuate said control valve which actuates said wheel actuator assembly to raise and lower said weed puller apparatus.

11. A weed puller apparatus as described in claim 10, wherein:
    (a) said wheel support assembly having a wheel member connected to a lateral support arm which, in turn, has one end pivotally connected to said main support means; and (b) said wheel actuator assembly having a piston and cylinder assembly mounted between said wheel member and said main support means; and (c) said piston and cylinder assembly operable by said control valve to expand and contact to raise and lower said weed puller apparatus.

12. A weed puller apparatus as described in claim 11, wherein:

(a) said control valve supplied with pressure fluid from the farm tractor or an auxiliary source; and (b) said sensing arm movable about a pivot point to control movement of the pressure fluid to said piston and cylinder assembly to control level of said weed puller apparatus;

whereby said crop level sensing control means operates to automatically sense crop level and maintain said weed puller apparatus at the desired clearance height thereabove.

13. A weed puller apparatus adapted to be connected to a vehicle such as a farm tractor to be pulled through a crop having weed members to be removed, comprising:

(a) a main support member connected to the farm tractor;

(b) weed pulling means connected to said main support member having cooperative pairs of weed pulling assemblies;

(c) adjacent ones of said weed pulling assemblies each having two adjacent wheel members in frictional contact with an adjacent set of two wheel members; and (d) power means connected to one of said weed pulling assemblies to drive one set of said wheel members which, in turn, drives the remaining sets of wheel members being in frictional contact with each other;

whereby only one set of said wheel members are positively driven and cooperating surfaces of said sets of wheel members are operable to grasp the weed members to pull upwardly and outwardly of the supporting soil and the use of sets of said wheel members allows for a greater longitudinal weed grasping surface and larger area of frictional contact between the cooperating surfaces of said wheel members.

14. A weed puller apparatus as described in claim 13, wherein:

(a) each of said weed pulling assemblies having a guard member mounted about a respective one of said support shaft assemblies and connected to said wheel members for conjoint rotation therewith to prevent material from wrapping and collecting thereabout.

15. A weed puller apparatus as described in claim 14, wherein:

(a) said guard member of a cylindrical shape extended substantially the entire length of said support shaft assembly to protect same.

16. A weed puller apparatus as described in claim 13, wherein:

(a) each of said weed pulling assemblies having a spike member connected to an outer periphery of respective ones of said guard members being operable to contact, on rotation of wheel members, the weed members and straightens same for subsequent pulling thereof by said cooperating wheel members.

17. A weed puller apparatus as described in claim 16, wherein:

(a) a plurality namely four, of said spike members are mounted and equally spaced about a periphery of said guard member; and (b) each of said spike members are mounted in resilient support clamps secured to said guard member whereby said spike members are flexible on hitting obstructions.

18. A weed puller apparatus as described in claim 14, including:

(a) a crop level sensing control means including a wheel support assembly mounted at each opposite end of said main support means, a wheel actuator assembly mounted between each of said wheel support assemblies and said main support means, and a crop level sensing assembly connected to said main support means and operably connected to each of said wheel actuator assemblies;

(b) said crop level sensing assembly includes a sensing arm connected to a control valve; and (c) said control valve connected to said wheel actuator assembly which, in turn, is operable to raise and lower said main support means relative to said wheel support assemblies;

whereby said sensing arm is movable on contact with the crop members to actuate said control valve which actuates said wheel actuator assembly to raise and lower said weed puller apparatus.

* * * * *